United States Patent
Su

(10) Patent No.: US 8,401,117 B1
(45) Date of Patent: Mar. 19, 2013

(54) METHOD OF ADAPTIVE MODULATION FOR COGNITIVE RADIOS USING A FAST AND SIMPLIFIED MODULATION RECOGNITION

(75) Inventor: Wei Su, Bel Air, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/373,245

(22) Filed: Nov. 4, 2011

(51) Int. Cl.
*H03K 9/00* (2006.01)
*H04L 7/00* (2006.01)
(52) U.S. Cl. ........................ 375/316; 455/130
(58) Field of Classification Search ............ 375/316
See application file for complete search history.

(56) References Cited

U.S. PATENT DOCUMENTS

| | | | |
|---|---|---|---|
| 8,085,882 B1* | 12/2011 | Su | 375/340 |
| 8,223,890 B1* | 7/2012 | Su | 375/324 |
| 8,295,409 B1* | 10/2012 | Su | 375/340 |
| 2007/0211786 A1* | 9/2007 | Shattil | 375/141 |
| 2012/0127889 A1* | 5/2012 | Yomo et al. | 370/252 |

* cited by examiner

*Primary Examiner* — Erin File
(74) *Attorney, Agent, or Firm* — Azza M. Jayaprakash

(57) ABSTRACT

Method for automatic modulation recognition in adaptive modulation based cognitive software defined radio (SDR), including receiving a transmitter signal from a transmitter; inputting signal data frame r(k), k=1, . . . , K; estimating SNR for data frame; feeding channel condition to transmitter; selecting one of plurality of predetermined modulation schemes from database; determining whether SNR(r(k))< or =threshold $T^{(i)}$; reporting failure if SNR(r(k))< or =$T^{(i)}$ and if not then estimating mean $b_j^{(i)}(k)$ for r(k); calculating $\|r(k)-\hat{b}^{(i)}(k)\|^2$; accumulating to calculate $$g^{(i)} = \sum_{k=1}^{K} \left\| r(k) - \hat{b}^{(i)}(k) \right\|^2;$$

repeating above steps from selecting for the other predetermined modulation schemes; finding minimum $$g^{(i)} = \sum_{k=1}^{K} \left\| r(k) - \hat{b}^{(i)}(k) \right\|^2;$$

determining whether [K/SNR(r(k))−g(I)]<predetermined D; reporting the modulation scheme if determination is yes and failure if no. An SDR can be configured to perform the above method.

18 Claims, 4 Drawing Sheets

METHOD OF ADAPTIVE MODULATION FOR COGNITIVE RADIOS USING A FAST AND SIMPLIFIED MODULATION RECOGNITION

GOVERNMENT INTEREST

The invention described herein may be manufactured, used, imported, sold, and licensed by or for the Government of the United States of America without the payment to me of any royalty thereon.

FIELD OF THE INVENTION

Software-defined radio (SDR) based adaptive demodulation is an effective technique for designing cognitive radios to maximize the communication data rate within the given bandwidth. Automatic modulation recognition is a tool in selecting the correct demodulation scheme automatically without hand shaking between the transmitter and receiver. Since the existing modulation recognition methods are time consuming and computationally intensive, a fast and simplified modulation recognition method is essential to meet the requirement of designing a cognitive radio with the real time adaptive demodulation and lower false modulation detection rate.

BACKGROUND OF THE INVENTION

With the revolution of digitizing communications ever closer to the antenna, SDR with programmable modulation schemes and transmission rates has become a practical wireless communication platform. Recently, modulation classification techniques have attracted much attention in SDR applications to develop cognitive radios with automatic modulation scheme recognition and selection. The concept is to exploit the radio transmission environment and choose the best modulation scheme to maximize the channel capacity in real time. The general principles of SDRs and modulation classifications or schemes are presented in the following publications which are incorporated herein in their entirety: Y. Huang and A. Polydoros, Likelihood methods for MPSK modulation classification. *IEEE Trans. Commun.*, vol. 43, 1493-1504; J. Sills, Maximum-likelihood modulation classification for PSK/QAM. *Proc. MILCOM '99*, 1999, 57-61; K. Umebayshi et al., "Blind estimation of the modulation scheme adapted to noise power based on a concept of software define radio," in Proc. in European Wireless 2002 (EW2002), pp. 829-834 (2002-02); O. Menguc and F. Jondral, "Air interface recognition for a software radio system exploiting cyclostationarity," in Proc. of the 15th IEEE Personal, Indoor and Mobile Radio Communications, Vol. 3, September 2004, pp. 1947-1951. The concept of automatic modulation classification is also discussed in "Real-time Modulation Classification Based on Maximum Likelihood," by Wei Su, Jefferson L. Xu and Mengchu Zhou. This publication was presented to the IEEE in about November 2008 and is incorporated herein in its entirety. Further discussion of software-defined radio and modulation recognition is presented in "Software Defined Radio Equipped with Rapid Modulation Recognition" by Jefferson L. Xu, Wei Su, *Senior Member*, IEEE and Mengchu Zhou, *Fellow, IEEE*, which is also incorporated herein in its entirety. The latter publication was also presented to the IEEE in about October 2009.

In cognitive radio, the signal data can be transmitted frame by frame. The modulation scheme in each data frame was determined depending upon the channel condition estimated before the transmission. The adaptive modulation scheme maintains the bit-error rate (BER) below a certain threshold to ensure the quality of the service in data transmission. To do this, a known pilot symbol is used in the transmitted data frame to indicate the modulation scheme for proper demodulation of the receiver.

Recently, some research has been done on migrating the existing automatic modulation classification algorithms to recognize the modulation scheme change automatically without the redundant pilot symbols. A common practice is to have a modulation estimator to operate in parallel with a programmable demodulator in the receiver. A change in the modulation scheme of the transmitter in each data frame will be detected and the demodulator will be cued to change the demodulation scheme accordingly. The objective of the automatic modulation recognition is to identify the modulation scheme of a transmitted signal with a high probability of success within a short observation time. The popular algorithms are maximum likelihood based approaches such as average likelihood ratio test (ALRT) and generalized likelihood ratio test (GLRT), high-order statistics based approaches such as moments and cumulants, cyclic frequency based approaches, and some other approaches such as zero-crossing and spectral correlation etc.

Most of the existing practical automatic modulation classification methods have been developed for military applications which are time-consuming and computationally intensive in order to meet the blind and non-cooperative signal collection environment. However, the commercial cognitive radios operate in the quite different environment and face the different challenges. The prompt and low-cost processing are the key to success and new techniques are needed to meet the real-time demodulation capability.

SUMMARY OF THE INVENTION

The present invention is directed to a method for automatic modulation recognition in an adaptive modulation based cognitive software defined radio (SDR), comprising receiving a signal from a transmitter into the SDR; inputting a frame of data r(k) from the signal, k=1, 2, . . . , K; estimating the signal to noise ratio (SNR) for said frame of data r(k); feeding back the channel condition to the transmitter; selecting one of a plurality of predetermined modulation schemes from a database; determining for the one of a plurality of predetermined modulation schemes whether SNR(r(k)) is less than or equal to a predetermined threshold $T^{(i)}$; reporting a failure if SNR(r(k)) is less than or equal to a predetermined threshold $T^{(i)}$; estimating the mean $b_j^{(i)}(k)$ for r(k) if SNR(r(k)) is not less than or equal to a predetermined threshold $T^{(i)}$; calculating $\|r(k)-\hat{b}^{(i)}(k)\|^2$; accumulating to calculate $$g^{(i)} = \sum_{k=1}^{K} \left\| r(k) - \hat{b}^{(i)}(k) \right\|^2;$$

repeating for each of the other plurality of predetermined modulation schemes from a database each of the above steps starting from selecting one of a plurality of predetermined modulation schemes from a database; finding the minimum value of $$g^{(i)} = \sum_{k=1}^{K} \left\| r(k) - \hat{b}^{(i)}(k) \right\|^2;$$

determining whether [K/SNR(r(k))−g(I)] is less than a predetermined D; and reporting the modulation scheme if the determination in the aforementioned step is yes and reporting a failure if the determination is no.

In one preferred embodiment of the present invention, the method for fast automatic modulation recognition in an adaptive modulation based cognitive software defined radio (SDR) further comprises providing a buffer wherein the signal frame of data r(k) is inputted from the buffer. Preferably estimating the signal to noise ratio (SNR) for said frame of data r(k) can be done coarsely. Feeding back the channel condition to the transmitter provides for selection of the modulation scheme of the next transmitting data frame. In an alternative embodiment, the method for fast automatic modulation recognition further comprises the step of buffering $$g^{(i)} = \sum_{k=1}^{K} \left\| r(k) - \hat{b}^{(i)}(k) \right\|^2.$$

In yet another embodiment, the method of the present invention further comprises the step of including a means for data processing. The method can provide for including a storage medium encoded with machine-readable computer program code for implementing the method steps in the means for data processing. The method can also provide for the step of choosing the final modulation scheme by applying uniformity test if there exist nested constellations.

In another preferred embodiment, the step of accumulating to calculate $$g^{(i)} = \sum_{k=1}^{K} \left\| r(k) - \hat{b}^{(i)}(k) \right\|^2$$

can include passing the inputted data frame through a matched filter bank to form the assessment values.

The present invention is also directed to an adaptive modulation based cognitive software defined radio (SDR) for automatic modulation recognition, comprising an antenna for collecting a signal from a transmitter; means for inputting a frame of data r(k) from the signal; means for estimating the signal to noise ratio (SNR) for the frame of data r(k); means for determining for each of a plurality of predetermined modulation schemes whether SNR(r(k)) is less than or equal to a predetermined threshold $T^{(i)}$; means for reporting a failure if SNR(r(k)) is less than or equal to a predetermined threshold $T^{(i)}$; means for estimating the mean $b_j^{(i)}(k)$ for r(k) if SNR(r(k)) is not less than or equal to a predetermined threshold $T^{(i)}$; means for calculating $\|r(k)-\hat{b}^{(i)}(k)\|^2$; means for accumulating to calculate $$g^{(i)} = \sum_{k=1}^{K} \left\| r(k) - \hat{b}^{(i)}(k) \right\|^2;$$

means for finding the minimum value of $$g^{(i)} = \sum_{k=1}^{K} \left\| r(k) - \hat{b}^{(i)}(k) \right\|^2;$$

means for determining whether [K/SNR(r(k))−g(I)] is less than a predetermined threshold D; and means for reporting the modulation scheme if determining whether [K/SNR(r(k))−g(I)] is less than a predetermined D is yes and reporting a failure if that determining is no.

In a preferred embodiment, the adaptive modulation based cognitive software defined radio (SDR) for fast automatic modulation recognition further comprises a buffer wherein the signal frame of data r(k) is inputted from buffer. Preferably, the means for estimating the signal to noise ratio (SNR) for said frame of data r(k) is done coarsely. The adaptive modulation based cognitive software defined radio (SDR) for fast automatic modulation recognition according to one embodiment of the present invention further comprises means for feeding back the channel condition to the transmitter so as to provide for selection of the modulation scheme of the next transmitting data frame. Also the SDR can include means for buffering $$g^{(i)} = \sum_{k=1}^{K} \left\| r(k) - \hat{b}^{(i)}(k) \right\|^2.$$

The SDR of the present invention can also comprise means for data processing. The SDR can further include storage medium encoded with machine-readable computer program code for implementing the steps of the method of the present invention in the means for data processing. The SDR can preferably include means for choosing the final modulation scheme by applying uniformity test if there exist nested constellations.

Yet still in another preferred embodiment, the adaptive modulation based cognitive software defined radio (SDR) for fast automatic modulation recognition according to the present invention, the means for accumulating to calculate $$g^{(i)} = \sum_{k=1}^{K} \left\| r(k) - \hat{b}^{(i)}(k) \right\|^2$$

can comprise a matched filter bank for passing the inputted data frame through the matched filter bank to form the assessment values.

BRIEF DESCRIPTION OF THE DRAWINGS

The advantages of the present invention will become more apparent from the following detailed description in conjunction with the drawings in which.

DETAILED DESCRIPTION OF THE INVENTION

Figure 1:
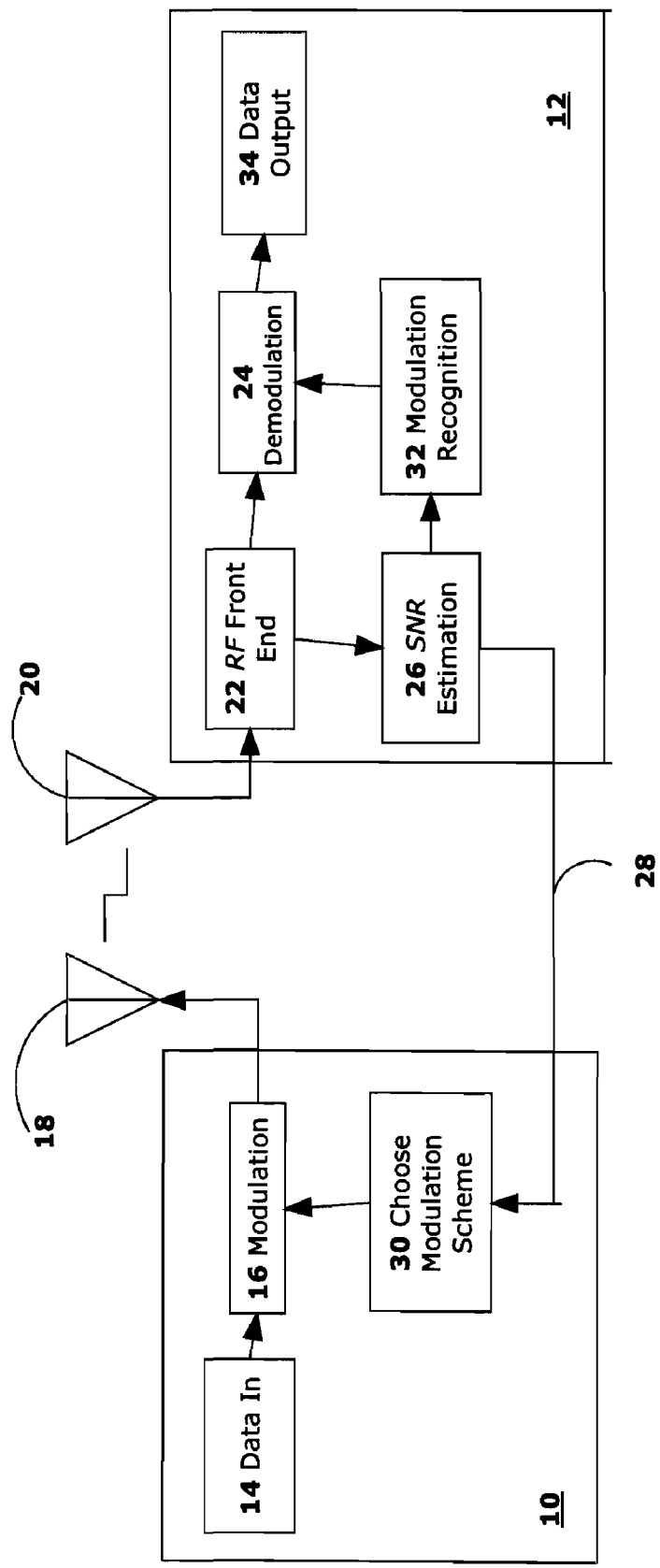
FIG. 1 is the conceptual block diagram for the transmitter and receiver pair according to the present invention.

An embodiment of the concept of an adaptive modulation based cognitive radio is shown in FIG. 1. As used herein, the term radio includes both the transmitter 10 and receiver 12 or either one individually. During their operations, both the transmitter 10 and receiver 12 can either be transmitting or receiving depending on the specific operations taking place. For example, when the receiver 12 is providing a feedback, as described below, it is operating then as a transmitter.

The radio shown in FIG. 1 demonstrates that the transmitting data can be modulated by various modulation schemes to give the highest channel capacity based on the channel conditions fed back from the receiver. The transmitted data at the receiver is demodulated using the appropriate modulation scheme selected by an automatic modulation recognition process.

The transmitting data 14 can be modulated in the modulation module 16 by various modulation schemes to provide the highest channel capacity based on the channel conditions. The modulated transmitting data 14 is transferred via antenna 18 to antenna 20 of the receiver 12. The received data signal is passed through the RF front end module 22 and then to a demodulation module 24. However, before the received data signal can be demodulated, the varying channel condition is estimated at the receiver side in the Signal to Noise (SNR) estimation module 26 based on the SNR, BER-, or other channel parameters and fed back to the transmitter as a signal which is shown schematically as the feedback link 28. The feedback signal is passed to the "choose modulation scheme" module 30 to control the modulation module 16 as discussed in more detail below.

The transmitted data at the receiver 12 is demodulated using the appropriate modulation scheme selected by an automatic modulation recognition process in the modulation recognition module 32. The modulation scheme is passed to the demodulation module 24 as shown in FIG. 1. After the transmitted data is demodulated it is passed as the data out signal 34. No redundant pilot symbols are needed.

This invention proposed a fast and simplified modulation classification method to recognize digital modulation schemes including phase-shift-keying (PSK) modulation and quadrature-amplitude modulation (QAM) using a hypothesis test approach. The concept is that if the hypothesis is true, the SNR of the signal will be maximized and the difference between the SNRs before and after processing should be minimized.

Define a random complex variable $$r(k) = b(k) + n(k) \quad (1)$$

where $n(k)$, $k=1, 2, \ldots, K$, is a zero mean additive white Gaussian noise, and $b(k)$ is the time-varying mean value of $r(k)$. If the random variables $r(1), r(2), \ldots,$ and $r(k)$ are distributed among M regions denoted by $R(b_1), R(b_2), \ldots,$ and $R(b_M)$ in the in-phase and quadrature constellation plan, and $b(k)$ has M possible values denoted by $b_1, b_2 \ldots,$ and $b_M$, respectively, the noise variance of, $n(k)$, at the region $R(b_j)$, is described by $$v_j = \frac{1}{K_j} \sum_{k \in I(b_j)} \|r(k) - b_j\|^2 \quad (2)$$

$$j = 1, 2, \ldots, M$$

where $I(b_j)$ is a set of index associated with $r(k)$ such that if the index $k \in I(b_j)$, $r(k)$ will belong to the region $R(b_j)$ and $K_j$ is the number of $r(k)$ samples which fall into the region $R(b_j)$, Thus, the variance of $r(k)$ over the entire regions is $$v = \frac{1}{K} \sum_{j=1}^{M} K_j v_j = \frac{1}{K} \sum_{j=1}^{M_j} \sum_{k \in I(b_j)} \|r(k) - b_j\|^2 = \frac{1}{K} \sum_{k=1}^{K} \|r(k) - b(k)\|^2 \quad (3)$$

where $b(k)$ is a time-varying mean with M number of possible discrete values belong to the set $\{b_1, b_2, \ldots, b_{M_i}\}$.

EQ(3)-EQ(5) can be extended to the classification among L number of linear modulation schemes. It is implemented by choosing the maximum SNR (or minimum noise variance) among L hypotheses, denoted by $H_1, H_2, \ldots,$ and $H_L$. For hypothesis $H_i$ (the $i^{th}$ modulation scheme), $i=1, 2, \ldots, L$, assuming there are M, symbol alphabets $\{b_1^{(i)}, b_2^{(i)}, \ldots, b_{M_1}^{(i)}\}$ in baseband coding, where $b_j^{(i)}$, $j=1, 2, \ldots, M_i$, is uniformly distributed over the alphabet set and has zero mean. For the convenience in analysis, the alphabets at the instance k is denoted by a time-varying complex number $b^{(i)}(k)$, which is unknown but belong to the known alphabet set $\{b_1^{(i)}, b_2^{(i)}, \ldots b_{M_i}^{(i)}\}$. Let $r(k)$ be a noisy copy of $b^{(i)}(k)$ obtained from the output of the receiver matched filter and decimated to one sample per symbol, we have $$r(k) = b^{(i)}(k) + n(k) \quad (4)$$

where both $r(k)$ and $b^{(i)}(k)$ are normalized to unity power, and $n(k)$ is the white Gaussian noise.

The variance under the hypothesis $H_i$, is $$v^{(i)} = \quad (5)$$

$$\frac{1}{K} \sum_{j=1}^{M} K_j^{(i)} v_j^{(i)} = \frac{1}{K} \sum_{j=1}^{M_j} \sum_{k \in I(b_j^{(i)})} \|r(k) - b_j^{(i)}\|^2 = \frac{1}{K} \sum_{k=1}^{K} \|r(k) - b^{(i)}(k)\|^2$$

where $v_j^{(i)}$, $b_j^{(i)}$, $K_j^{(i)}$, and $I(b_j^{(i)})$ are the variance, mean, numbers of samples, and indices of $r(k)$ with $k \in I(b_j)$ within the region $R(b_j^{(i)})$ under the hypothesis $H_i$. Since the result of EQ. 5 needs the knowledge of $b^{(i)}(k)$ and $R(b_j^{(i)})$ we estimate them under the assumption that the SNR of $r(k)$ is reasonably high such that all the noisy copies of $b_j^{(i)}(k)$ will be statistically located inside the boundary of region $R(b_j^{(i)})$. To satisfy this assumption, the threshold $T^{(i)}$ for hypothesis $H_i$, $i=1, \ldots, L$, is calculated offline based on the BER requirement for the $i^{th}$ modulation scheme, and the coarse SNR of $r(k)$ is estimated online. Existing methods can be used for both BER and SNR estimation. If the estimated SNR is below the threshold $T^{(i)}$, the BER is too high and the communication will not be demodulated reliably. Therefore, the hypothesis $H_i$ will be disqualified from the modulation recognition operation and the low-SNR error message will be reported. Otherwise, for each $r(k)$, an correspondent estimate $\hat{b}^{(i)}(k) = b_j^{(i)}$ is obtained if, at the instance k, $b_j^{(i)}$ is the closest alphabet to $r(k)$. Mathematically, if $\|r(k) - b_1^{(i)}(k)\|^2 \leq \|r(k) - b_j^{(i)}(k)\|^2$ for $j=2, 3, \ldots, L$, $\hat{b}^{(i)}(k) = b_1^{(i)}$ will be chosen.

Next, EQ. 5. is reformatted to form an assessment value:

$$g^{(i)} = \sum_{k=1}^{K} \left\| r(k) - \hat{b}^{(i)}(k) \right\|^2 \quad (6)$$

$$\text{if } SNR(r(k)) \leq T^i \quad (7)$$

where $SNR(r(k))$ is the coarse SNR estimate. The hypothesis $H_{i=1}$ is chosen if $g^{(i=1)}$ is a minimum among all $g^{(i)}$, for $i=1, 2, \ldots L$.

The $I^{th}$ modulation scheme is selected if the hypothesis $H_{i=1}$ is true and $$\left|\frac{K}{SNR(r(k))} - g^{(I)}\right| < D \quad (8)$$

If the condition in EQ. 8 is not satisfied, the hypothesis $H_{i=1}$ will be rejected and the recognition error will be reported. The threshold D is selected by user based on the trade-off between false recognition rate and rejection rate.

In the cases of nested constellation, that is the constellations of hypothetic modulation schemes are encapsulated among each other, more than one modulation schemes may pass the hypothesis test and be selected by the modulation recognition process 32. Therefore, a Uniformity Tester will be added after Data Out 34 (or before the block 13 in FIG. 3) to choose the final winner. Under the assumption that r(k) is uniformly distributed among M regions, the difference between $K_q^{(i)}$ and $K_j^{(i)}$, q, j=1, 2, ..., M, should be smaller than a given threshold. The Uniformity Tester exams the uniform distribution property of $K_j^{(i)}$, j=1, 2, ..., M, for all hypothesis $H_1, H_2, \ldots,$ and $H_L$. Finally, the hypothesis $H_i$ will be chosen if $K_j^{(i)}$ is the only one to pass the uniformity test.

After the modulation scheme of the received data being recognized, an appropriate demodulator will be selected and the data will be demodulated. Unlike the GLRT algorithm, SNR(r(k)) is used in EQ. 7 for eliminating the false detection caused by too many outliers and in EQ. 8 for excluding false detection caused by the modulation schemes beyond the given hypotheses.

Figure 2:
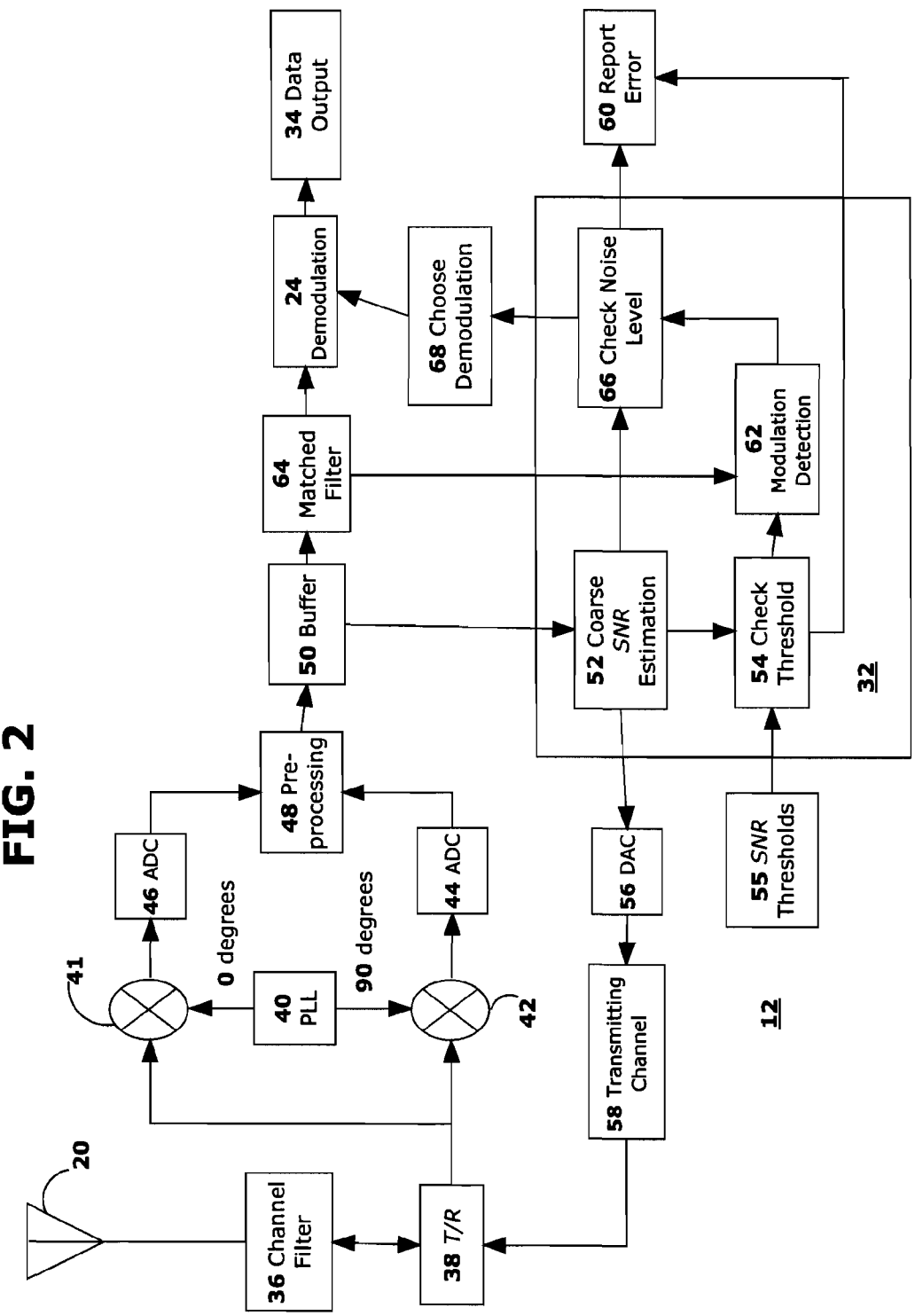
FIG. 2 is the conceptual block diagram of a software defined radio receiver according to the present invention.

The conceptual block diagram for the receiver 12 is presented in FIG. 2, which shows that modulation recognition unit or module 32 is in parallel with the software demodulator module 24. The SDR in FIG. 2 demonstrates a modulation recognition unit in parallel with the software demodulator. The modulation scheme for the received data block is chosen based on the modulation recognition result. The SNR of the communication channel is estimated and fed back to the transmitter.

In one embodiment, the signal received from the antenna 20 passes through a channel filter 36 and thereafter to the transmitter/receiver (T/R) splitter 38 and down converted coherently to baseband with a phase-locked loop (PLL) 40 after passing through mixers 41 and 42. The baseband signal is digitized by the analog to digital converters (ADC) 44 and 46 and pre-processed in processing module 48 which includes frequency down-conversion and tracking, phase tracking, timing synchronization and decimation, analog-to-digital conversion (ADC), matched filtering, channel equalization, and other appropriate and/or necessary steps. All of them can be implemented with the existing methods well known to those of ordinary skill in the art. The baseband symbol after pre-process is stored in the buffer 50 for digital signal processing. The buffer 50 signal is passed to modulation recognition module 32 which includes a coarse SNR estimation module 52 which feeds both a check threshold module 54 and a digital-to-analog converter (DAC) module 56. The DAC module 56 signal is passed through a transmitting channel module 58 and back through the transmitter/receiver (T/R) splitter 38 to the antenna 20 for feedback transmission back to the transmitter.

The check threshold module 54 receives thresholds from the SNR thresholds module 55 and feeds a signal to the report error output 60 or, depending on the threshold determined, to a modulation detection module 62. The latter module 62 also receives the signal from buffer 50 after passing through the matched filter module 64. The modulation detection module 62 feeds its signal to a check noise level module 66 which also receives a signal from the coarse SNR estimation module 52. If the noise level is above the threshold, the check noise level module 66 passes a message to the report error output 60.

Alternatively, the check noise level module 66 passes a signal to a choose demodulator module 68 that indicates to demodulation module 24 the modulation scheme for the received signal. The latter comes from the buffer 50 through matched filter 64 to the demodulation module 24 which provides the demodulated signal to the data out terminal 34 as shown in FIG. 2.

The modulation scheme of the received data block is chosen based on the modulation recognition result. The SNR of the communication channel is estimated and fed back to the transmitter 10 via the digital-to-analog converter (DAC) 56 and T/R 38.

Figure 3:
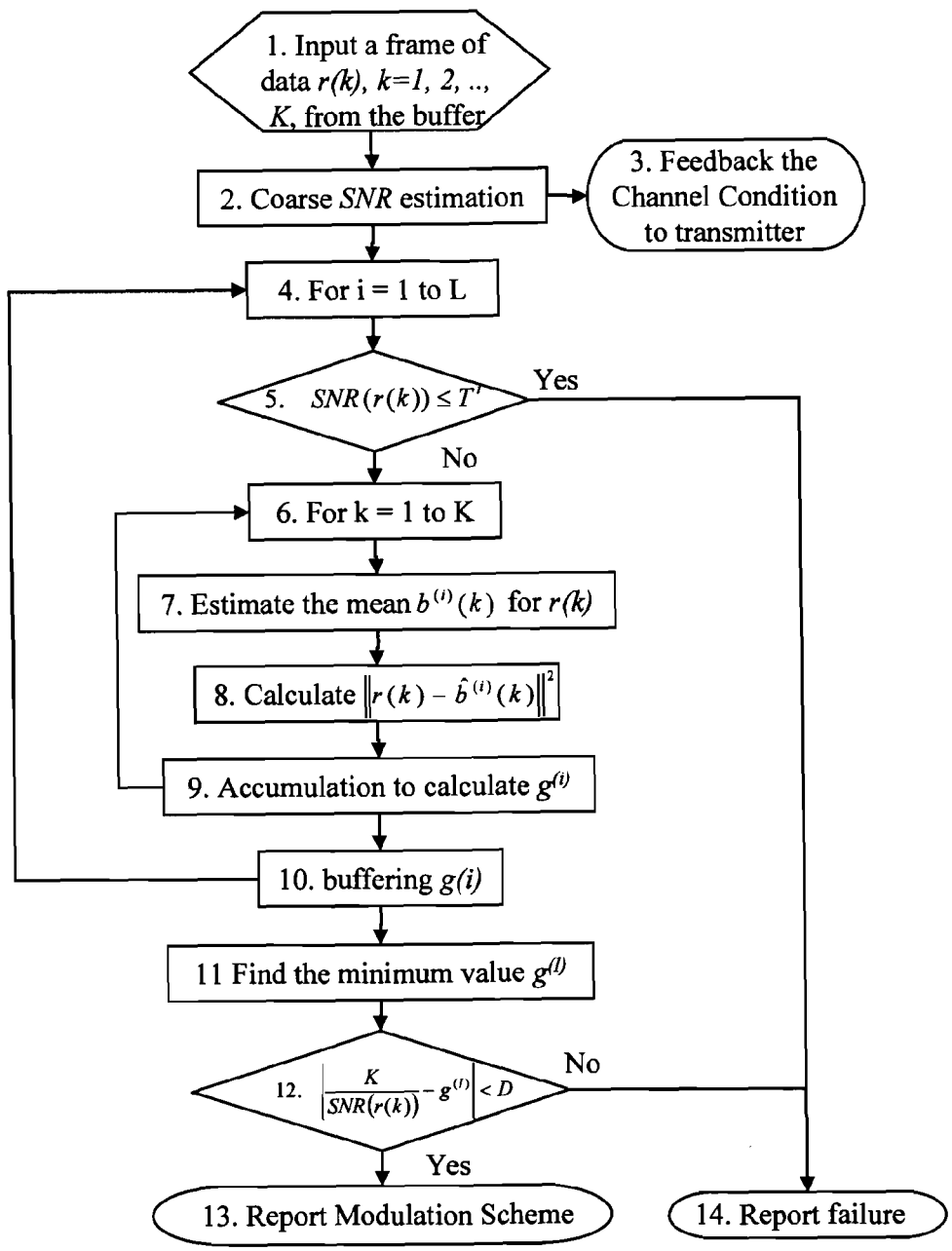
FIG. 3 is the software processing flowchart for the automatic modulation recognition according to an embodiment of the present invention.

The modulation recognition process is described by a flowchart shown in FIG. 3, which takes the data frame in step 1 from the buffer to coarse estimate the SNR in step 2 to feed back to the transmitter 10 in step 3 to select the modulation scheme of the next transmitting data frame, and to determine if there is sufficient signal power to demodulate the current received data frame with respect to the hypothesis $H_i$. Assuming there is L number of hypotheses in step 4 that pass the SNR test in step block 5, the assessment values $g^{(1)}, g^{(2)}, g^{(L)}$ are calculated via the i-loop between step block 4 and step block 10. The value $g^{(i)}$ is calculated via the k-loop between block step 6 and step block 9. Then, the minimum value $g^{(1)}$ is found in step 11 and checked with the condition in step block 12. If $g^{(1)}$ passes the test along the Yes route in FIG. 3, the modulation scheme is recognized and reported in step 13. Notice that according to various embodiments, the calculation from step block 4 to step block 10 can be implemented by parallel processing or by pre-calculated look-up tables. Therefore the modulation scheme can be recognized promptly, with simple processing, before the arrival of the next data frame.

Figure 4:
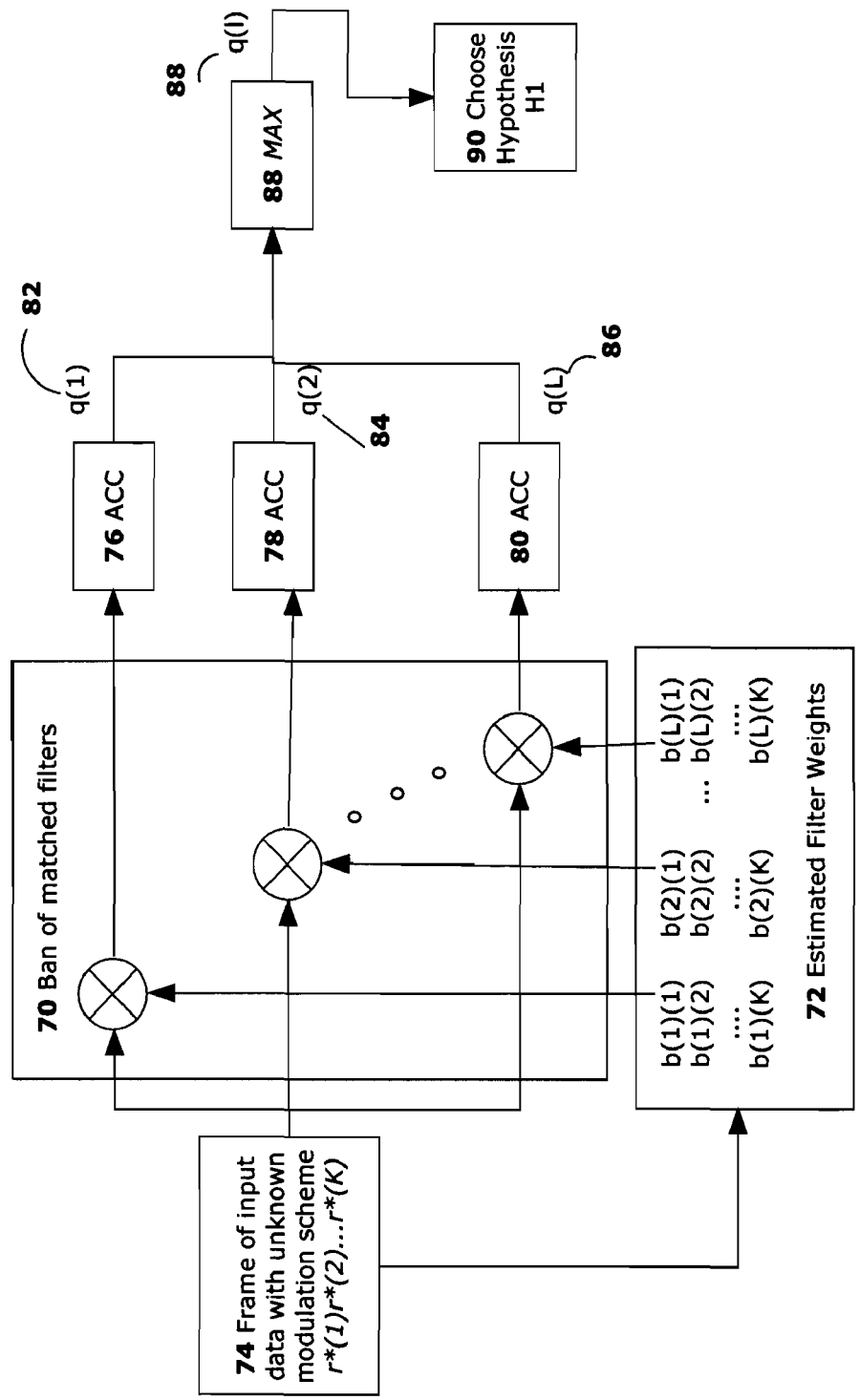
FIG. 4 is the conceptual block diagram of an alternative embodiment of the present invention wherein the SDR selects hypothesis using a bank of matched filters.

An alternative implementation of choosing the hypothesis $H_i$ is to use a bank of matched filters as shown in FIG. 4. By rearranging the assessment value in EQ. 6, we have:

$$g^{(i)} = \sum_{k=1}^{K} \|r(k)\|^2 + \sum_{k=1}^{K} \|b^{(i)}(k)\|^2 - 2\sum_{k=1}^{K} (r^*(k) \cdot b^{(i)}(k)) \quad (9)$$

where the sign '*' denotes the complex conjugate operation, and the first and the second terms are statistically equal to unities due to the normalization of the powers and they have little contribution to the assessment. Thus, the assessment value can be further simplified by calculating $$q^{(i)} = \sum_{k=1}^{K} (r^*(k) \cdot b^{(i)}(k)) \quad (10)$$

$$g^{(i)} \approx 2(1 - q^{(i)}) \quad (11)$$

such that the hypothesis $H_{i=1}$ is chosen if $q^{(i=1)}$ is a maximum for all $q^{(i)}$, i=1, 2, ... L. The winner hypothesis will be chosen based on the best correlation result.

As shown in FIG. 4, EQ. 10 provides a list of L number of matched filters 70. The weights 72 of the filters, $b^{(i)}(k)$s, i=1, 2, ..., L, and k=1, 2, ..., K, are time-varying among $M_i$ number of possible values belong to the set $\{b_1^{(i)}, b_2^{(i)}, \ldots, b_{M_i}^{(i)}\}$ and are estimated based on the values of the random input r(k) 74, for k=1, 2, ..., K. The input data frame passes through the matched filter bank 70 and accumulated (ACC), for example 76, 78 and 80, to form the assessment values $q^{(1)}$82, $q^{(2)}$84, ..., $q^{(L)}$86. Then the maximum (MAX) value $q^{(i=1)}$88 is found to determine the hypothesis $H_{i=1}$90.

Once the modulation scheme of the received data frame is recognized, the SDR selects the appropriate demodulator from the software library and the data frame in the buffer is demodulated. Frame by frame, the received signal is demodulated seamlessly and the modulation recognition is operating behind scenes without causing noticeable time delay in data communication.

This invention has the commercial application in developing the next generation software-defined radios and cognitive radios with adaptive demodulation capability in maximizing the channel bandwidth, and has military application in developing faster blind signal identification systems.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention. Accordingly, the present invention should not be limited by the foregoing description, but only by the appended claims.

What I claim is:

1. A method for fast automatic modulation recognition in an adaptive modulation based cognitive software defined radio (SDR), comprising:
    a. receiving a signal from a transmitter into the SDR;
    b. inputting a frame of data r(k) from the signal;
    c. estimating the signal to noise ratio (SNR) for said frame of data r(k);
    d. feeding back the channel condition to the transmitter;
    e. selecting one of a plurality of predetermined modulation schemes from a database;
    f. determining for said one of a plurality of predetermined modulation schemes whether SNR(r(k)) is less than or equal to a predetermined threshold $T^{(i)}$;
    g. reporting a failure if SNR(r(k)) is less than or equal to a predetermined threshold $T^{(i)}$;
    h. estimating the mean $b_j^{(i)}(k)$ for r(k) if SNR(r(k)) is not less than or equal to a predetermined threshold $T^{(i)}$;
    i. calculating $\|r(k)-\hat{b}^{(i)}(k)\|^2$;
    j. accumulating to calculate $$g^{(i)} = \sum_{k=1}^{K} \left\| r(k) - \hat{b}^{(i)}(k) \right\|^2;$$

k. repeating each of steps e. to j. for each of the other plurality of predetermined modulation schemes from a database;
    l. finding the minimum value of $$g^{(i)} = \sum_{k=1}^{K} \left\| r(k) - \hat{b}^{(i)}(k) \right\|^2;$$

m. determining whether [K/SNR(r(k))−g(I)] is less than a predetermined threshold D; and
    n. reporting the modulation scheme if the determination in step m is yes and reporting a failure if said determination is no.

2. The method for fast automatic modulation recognition in an adaptive modulation based cognitive software defined radio (SDR) of claim 1, further comprising providing a buffer wherein said signal frame of data r(k) is inputted from said buffer.

3. The method for fast automatic modulation recognition in an adaptive modulation based cognitive software defined radio (SDR) of claim 1, wherein said estimating the signal to noise ratio (SNR) for said frame of data r(k) is done coarsely.

4. The method for fast automatic modulation recognition in an adaptive modulation based cognitive software defined radio (SDR) of claim 1, wherein said feeding back the channel condition to the transmitter provides for selection of the modulation scheme of the next transmitting data frame.

5. The method for fast automatic modulation recognition in an adaptive modulation based cognitive software defined radio (SDR) of claim 1, further comprising the step of buffering $$g^{(i)} = \sum_{k=1}^{K} \left\| r(k) - \hat{b}^{(i)}(k) \right\|^2.$$

6. The method for fast automatic modulation recognition in an adaptive modulation based cognitive software defined radio (SDR) of claim 1, further comprising the step of including a means for data processing.

7. The method for fast automatic modulation recognition in an adaptive modulation based cognitive software defined radio (SDR) of claim 6, further comprising including a storage medium encoded with machine-readable computer program code for implementing the method steps of claim 1 in said means for data processing.

8. The method for fast automatic modulation recognition in an adaptive modulation based cognitive software defined radio (SDR) of claim 1, further comprising the step of choosing the final modulation scheme by applying uniformity test if there exist nested constellations.

9. The method for fast automatic modulation recognition in an adaptive modulation based cognitive software defined radio (SDR) of claim 1, wherein the step of accumulating to calculate $$g^{(i)} = \sum_{k=1}^{K} \left\| r(k) - \hat{b}^{(i)}(k) \right\|^2$$

includes passing said inputted data frame through a matched filter bank to form the assessment values.

10. An adaptive modulation based cognitive software defined radio (SDR) for fast automatic modulation recognition, comprising:
    an antenna for collecting a signal from a transmitter;
    means for inputting a frame of data r(k) from the signal;
    means for estimating the signal to noise ratio (SNR) for said frame of data r(k);
    means for determining for each of a plurality of predetermined modulation schemes whether SNR(r(k)) is less than or equal to a predetermined threshold $T^{(i)}$;

means for reporting a failure if SNR(r(k)) is less than or equal to a predetermined threshold $T^{(i)}$;

means for estimating the mean $b_j^{(i)}(k)$ for r(k) if SNR(r(k)) is not less than or equal to a predetermined threshold $T^{(i)}$;

means for calculating $\|r(k)-\hat{b}^{(i)}(k)\|^2$;

means for accumulating to calculate $$g^{(i)} = \sum_{k=1}^{K} \left\| r(k) - \hat{b}^{(i)}(k) \right\|^2;$$

means for finding the minimum value of $$g^{(i)} = \sum_{k=1}^{K} \left\| r(k) - \hat{b}^{(i)}(k) \right\|^2;$$

means for determining whether [K/SNR(r(k))−g(I)] is less than a predetermined threshold D; and means for reporting the modulation scheme if determining whether [K/SNR(r(k))−g(I)] is less than a predetermined D is yes and reporting a failure if said determining is no.

11. The adaptive modulation based cognitive software defined radio (SDR) for fast automatic modulation recognition of claim 10, further comprising a buffer wherein said signal frame of data r(k) is inputted from said buffer.

12. The adaptive modulation based cognitive software defined radio (SDR) for fast automatic modulation recognition of claim 10, wherein said means for estimating the signal to noise ratio (SNR) for said frame of data r(k) is done coarsely.

13. The adaptive modulation based cognitive software defined radio (SDR) for fast automatic modulation recognition of claim 10, further comprising means for feeding back the channel condition to the transmitter so as to provide for selection of the modulation scheme of the next transmitting data frame.

14. The adaptive modulation based cognitive software defined radio (SDR) for fast automatic modulation recognition of claim 10, further comprising means for buffering $$g^{(i)} = \sum_{k=1}^{K} \left\| r(k) - \hat{b}^{(i)}(k) \right\|^2.$$

15. The adaptive modulation based cognitive software defined radio (SDR) for fast automatic modulation recognition of claim 10, further comprising means for data processing.

16. The adaptive modulation based cognitive software defined radio (SDR) for fast automatic modulation recognition of claim 15, further comprising storage medium encoded with machine-readable computer program code for implementing the method steps of claim 1 in said means for data processing.

17. The adaptive modulation based cognitive software defined radio (SDR) for fast automatic modulation recognition of claim 10, further comprising means for choosing the final modulation scheme by applying uniformity test if there exist nested constellations.

18. The adaptive modulation based cognitive software defined radio (SDR) for fast automatic modulation recognition of claim 10, wherein said means for accumulating to calculate $$g^{(i)} = \sum_{k=1}^{K} \left\| r(k) - \hat{b}^{(i)}(k) \right\|^2$$

comprises a matched filter bank for passing said inputted data frame through said matched filter bank to form the assessment values.

\* \* \* \* \*